Dec. 16, 1924.
C. R. KNIGHT
ANIMAL TRAP
Filed Feb. 5, 1923
1,519,459
2 Sheets-Sheet 1
Fig. 1.
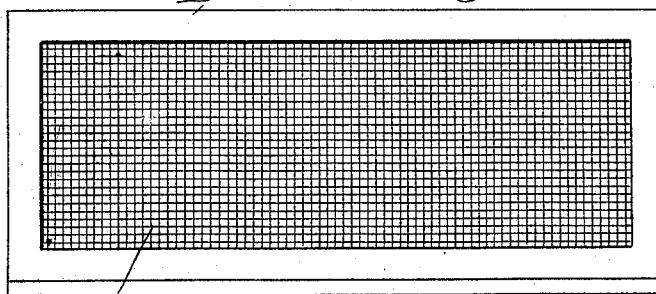
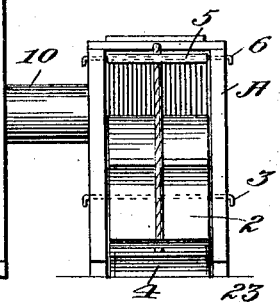
Fig. 2.
Fig. 3.
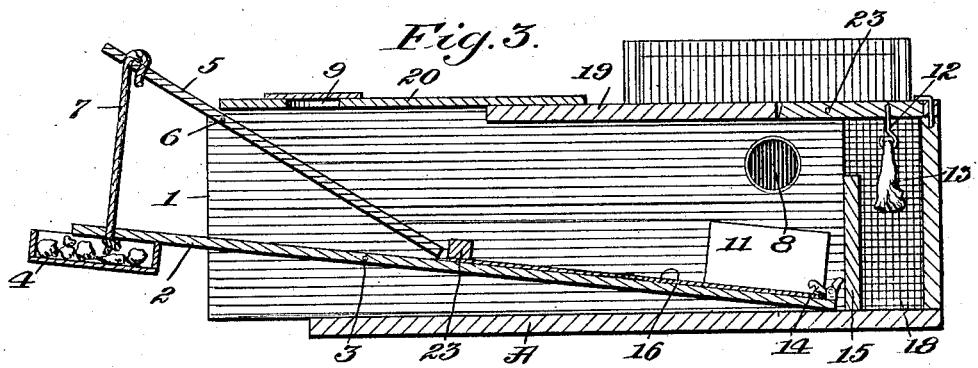
Inventor:
C. R. Knight
by John M. Mason.
Att'y.

Dec. 16, 1924.　1,519,459
C. R. KNIGHT
ANIMAL TRAP
Filed Feb. 5, 1923　2 Sheets-Sheet 2

Inventor:
C. R. Knight
by John M. Mason
Atty.

Patented Dec. 16, 1924.

1,519,459

UNITED STATES PATENT OFFICE.

CHARLES RICHARD KNIGHT, OF RANGER, TEXAS, ASSIGNOR OF ONE-HALF TO AMBROSE M. DILLAHUNTY, OF BEAUMONT, TEXAS.

ANIMAL TRAP.

Application filed February 5, 1923. Serial No. 616,988.

*To all whom it may concern:*

Be it known that I, CHARLES R. KNIGHT, a citizen of the United States, residing at Ranger, in the county of Eastland and State of Texas, have invented certain new and useful Improvements in Animal Traps, of which the following is a specification.

One object of my invention is to provide a trap which will automatically reset itself after making a catch.

Another object of the invention is to provide a trap having one or more passageways therefrom leading to a cage, the same being closed when the trap is set and automatically opened when the trap is sprung.

Another object of the invention is to provide a trap having a pivoted member upon which the animal walks when entering the trap, said pivoted member having a latch, the latch member being released by the weight of the animal after it has passed the pivotal point of the pivoted member.

Still another object is to provide a trap which is composed of a minimum number of parts, simple in operation and which requires no attention except the removal of the catch.

Other objects will appear hereinafter in the specification.

In the drawings:

Fig. 1 is an end elevation of one form of the device.

Fig. 2 is a vertical longitudinal section of the trap shown in Fig. 1, the same being in set position.

Fig. 3 is a similar view to Fig. 2 the trap being sprung.

Figure 4:
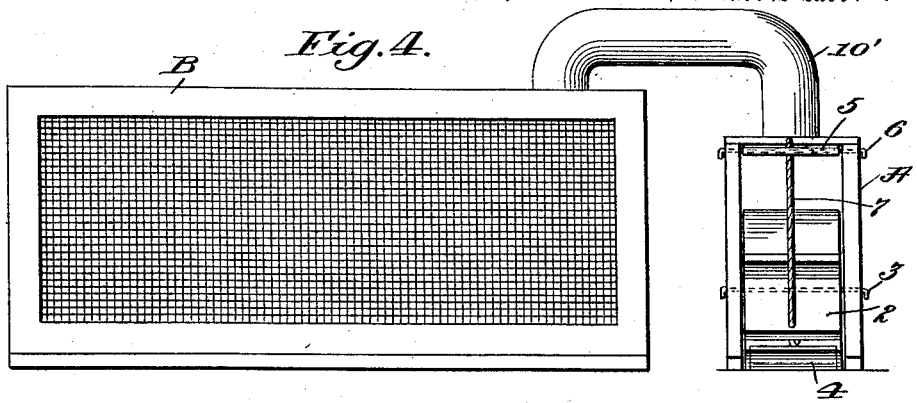
Fig. 4 is an end elevation of another form of the device.

The apparatus is composed of two box members A and B, Figs. 1 to 3, the member A being hereinafter referred to as the trap member and the member B being hereinafter referred to as the cage member. The trap member has an entrance 1 through which the animal enters the same being provided with a board 2 which is pivoted at 3. The board 2 has a counterweight 4, which counterweight normally maintains the board in its set position as illustrated in Fig. 1. There is a second board 5 pivoted at 6 hereinafter called the closure member which is connected to the board 2 by a rope, wire or other flexible connection 7. The closure member 5 is maintained in a substantially horizontal position when the trap is set, see Fig. 2, but assumes an oblique position when the trap is sprung as shown in Fig. 3.

As illustrated the trap has two exits numbers 8 and 9 both being closed from the inside when the trap is set and opened automatically when the trap is sprung, unless it be desired to use only one exit. In this case the other exit can be closed by any suitable means such as illustrated in Figs. 2 and 3 wherein exit 9 has been closed by closure member from the outside. Each exit when not in use is covered by a suitable cover such as illustrated at 9', Figs. 1, 2 and 3.

As illustrated in Figs. 1 to 3 the exit 8 is provided with a passageway 10 which leads from the trap into the cage B. Fastened to the board 2 at one end thereof is a closure or gate member 11. The gate member is attached to one side of the board 2 in such position as to move therewith and close the entrance 8 to the cage B when the trap is set thereby preventing the passage of an animal in the cage back into the trap when the same is in its normal or set position.

There is a latch 14 one part of which rests upon a partition 15 the same being pivoted upon the board 2. Also a spring piece 16 is mounted on board 2 the same having a releasable engagement with the latch 14.

17 and 18 indicate wire mesh forming parts of members B and A respectively. Said mesh may be dispensed with however and iron bars substituted therefor when it is desired to catch animals of more aggressive nature. The mesh illustrated is understood to be shown for the purposes of illustration only and any suitable material may be used which serves the purpose intended.

The trap is provided with a top member 19 which is cut off some distance from the trap entrance and a second top member 20 of less thickness is fastened thereon. This construction provides more space for the entrance of the animal as shown in Fig. 2 and also allows the board 5 to be pivotally secured to the sides of the trap A.

There is provided a hook or other suitable member 12 from which hangs a bait 13. Access to the bait may be had by a pivoted door member 21 pivoted at 23 to which the member 12 is attached.

22 indicates a suitable fastener for holding the door 21 closed.

28 illustrates a member for holding one end of the spring piece 16 in a fixed position.

Figure 5:
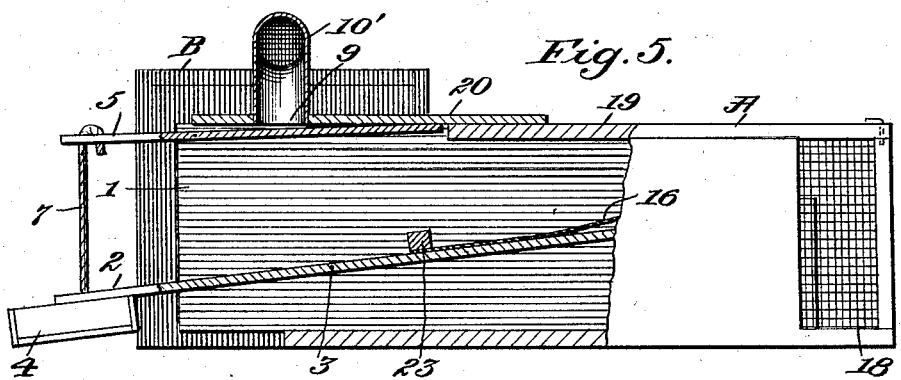
Fig. 5 is a side elevation of the construction as set forth by Fig. 4, one end being broken away.

Figs. 4 and 5 illustrate a modified form of the device wherein the curved member 10 is used to connect the upper exit 9 of the trap with the cage B. In this form the exit 8 is not used and is permanently closed by any suitable closure means such as illustrated at 9.

Figure 6:
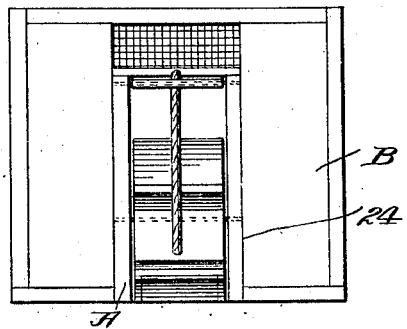
Fig. 6 is an end view of the device, the trap member being shown as placed within the cage member.

Fig. 6 illustrates another manner of using the trap and cage members where compactness and economy of space are essential. In this view the member A is placed within the member B, part of one end of which is cut away to provide for the reception of trap member A, the passage ways 10 and 10' being dispensed with.

As the interior of the trap A is constructed the same in all forms of the device, a description of the operation of the device as illustrated in Figs. 1 to 3 will be given for purposes of illustration.

The parts of the device being in set or operative position as illustrated in Fig. 2, an animal enters the trap at 1 by walking or crawling on board 2. When it has passed the pivot point 3 it comes upon the spring piece 16 and its weight releases the end of 16 from the latch 14, which snaps back to its released position and allows the board 2 to assume the position as illustrated in Fig. 3 and uncovers exit 8. At the same time tension being relieved from member 7, board 5, which until now has been held in horizontal position by tension applied by board 2 through flexible member 7, moves to its oblique position, closes entrance 1 and uncovers exit 9. If this exit is closed as illustrated in Figs. 2 and 3 the animal may only move through exit 8. When it has availed itself of this supposed means of escape it finds itself in cage B. After the animal has passed through exit 8 its weight being removed from board 2 the weight member 4 will return the parts to their set position, the latch piece 14 resting on member 15, spring piece 16 snapping in recess of latch member and gate member 11 closing exit 8 to cage B while board 5 assumes a horizontal position and closes exit. Both exits are opened and closed at the same time the selection of the exit or exits to be used depending upon the will of the trapper. If he desires to use the side exit only the device is set up as shown in Figs. 1 to 3. The use of the side exit can be had by setting up the device as shown in Figs. 4 and 5 and both exits can be used if set up as illustrated in Fig. 6.

The trap can be used for trapping animals of different sizes by making the same of large or small size as will readily be understood.

The latch member 14 and spring piece 16 may be dispensed with if necessary, but I prefer to use the same as the action of the trap is thereby made more snappy and positive in operation.

What I claim is:

1. In a trap, the combination of a trap member and a cage member having a passage connecting the same, a pivoted board member, a pivoted closure member havin a flexible connection with said pivoted board member for maintaining said pivoted closure member in a substantially horizontal position when the trap is set, said pivoted board member having a gate mounted on one side of said pivoted board member for closing the passageway to the cage member when the trap is set, said pivoted board member also having a latch and a spring piece released by the animal to be caught to spring the trap, and automatic means for returning the pivoted board member, pivoted closure member, latch and spring piece to normal or set position after the catch is made.

2. In a trap, the combination of a trap member and a cage member having a passage connecting the same, a pivoted board member, a pivoted closure member having a flexible connection with said pivoted board member for maintaining said pivoted closure member in a substantially horizontal position when the trap is set, said pivoted board member having a gate mounted on one side of said pivoted board member for closing the passageway to the cage member when the trap is set, said pivoted board member also having a latch and a spring piece released by the animal to be caught to spring the trap, and a counterweight for returning the pivoted board member, pivoted closure member, latch and spring piece to normal or set position after the catch is made.

In testimony whereof I affix my signature.

CHARLES RICHARD KNIGHT.